United States Patent [19]
Horikawa et al.

[11] Patent Number: 5,221,383
[45] Date of Patent: Jun. 22, 1993

[54] PNEUMATIC TIRE HAVING A CARCASS REINFORCED WITH A FLAT CORD MADE OF A PLURALITY OF INTERCONNECTED MONOFILAMENTS

[75] Inventors: Toru Horikawa, Hiratsuka; Tomohiko Kogure, Minamiashigara; Tsuneo Morikawa, Hadano; Yusaku Miyazaki; Masakazu Okihara, both of Hiratsuka, all of Japan

[73] Assignee: The Yokohama Rubber Co., Ltd., Tokyo, Japan

[21] Appl. No.: 786,748

[22] Filed: Nov. 1, 1991

[30] Foreign Application Priority Data

Nov. 21, 1990 [JP] Japan .................. 2-314294

[51] Int. Cl.$^5$ .................... B60C 9/00; B60C 9/04; B60C 9/08
[52] U.S. Cl. ..................... 152/451; 152/556; 264/177.13; 428/397
[58] Field of Search .............. 264/177.13; 428/397; 152/451, 556; 57/248, 902

[56] References Cited

U.S. PATENT DOCUMENTS

| | | | |
|---|---|---|---|
| 2,831,748 | 4/1958 | Finlayson et al. | 57/248 X |
| 3,298,417 | 1/1967 | Keefe, Jr. | 152/451 |
| 3,963,678 | 6/1976 | Conrad et al. | |
| 3,984,600 | 10/1976 | Kawase et al. | 438/364 |
| 4,634,625 | 1/1987 | Franklin | 428/258 |
| 4,698,083 | 10/1987 | Shioura et al. | 264/177.13 X |
| 4,850,412 | 7/1989 | Gupta | 152/556 |

FOREIGN PATENT DOCUMENTS

| | | | |
|---|---|---|---|
| 1313763 | 11/1962 | France | 152/451 |
| 2-57405 | 2/1990 | Japan . | |
| 2-57406 | 2/1990 | Japan . | |
| 2-303902 | 12/1990 | Japan . | |
| 2-303903 | 12/1990 | Japan . | |
| 2-303904 | 12/1990 | Japan . | |

*Primary Examiner*—Michael W. Ball
*Assistant Examiner*—Adrienne C. Johnstone
*Attorney, Agent, or Firm*—Finnegan, Henderson, Farabow, Garrett & Dunner

[57] ABSTRACT

A pneumatic tire for automobiles which has a carcass reinforced with polymeric monofilaments of the same or different diameter which are interconnected by radially inwardly curved peripheral extensions thereof to form a cord having a substantially flat transverse cross-sectional configuration as a whole.

7 Claims, 2 Drawing Sheets

PNEUMATIC TIRE HAVING A CARCASS REINFORCED WITH A FLAT CORD MADE OF A PLURALITY OF INTERCONNECTED MONOFILAMENTS

BACKGROUND OF THE INVENTION

1. Field of the Invention

This invention relates to pneumatic automobile tires, more particularly such a tire which has a carcass reinforced with monofilament cords.

Generally, pneumatic tires for use on automotive vehicles incorporate reinforcing cords made of metallic or fibrous materials. Fibrous tire cords are typically fabricated by twisting multifilaments of nylon, polyester and other organic polymers to a desired strand and have found wide use as they have an advantage over metallic tire cords particularly in terms of weight.

It has recently been proposed to use monofilaments in place of multifilaments in view of their higher rigidity. However, monofilaments of round cross section are found less resistant to fatigue. This problem is reportedly overcome by using cross-sectionally flat monofilaments such as of an elongate rectangular configuration shown in FIG. 7 of the accompanying drawings. Such flat monofilaments have not only increased fatigue resistance but also an anistropic flexural rigidity such that a tire incorporating them exhibit a minimum of deflection against vertically applied load and increased resistance to torsion at cornering, thus contributing to comfortable, stable drive performance. Cross-sectionally flat monofilaments when coated with rubber to produce carcass sheets may be oriented flatwise along the plane of the carcass so as to reduce the thickness of the carcass wall and further the overall weight of the tire. While flat monofilaments have such significant advantages, they are susceptible to rupture or separation at their interface with coating rubber as stresses become concentrated around sharply defined corners of the transverse cross-sectional zone of the monofilaments. This poses a durability problem with pneumatic tires in addition to reduced mechanical bond of the monofilaments with rubber as they are flat and smooth compared to multifilaments.

SUMMARY OF THE INVENTION

With the foregoing problems of the prior art in view, the present invention seeks to provide a pneumatic tire having a carcass reinforced with such a monofilamentary cord of substantially flat cross section which will eliminate separation from coating rubber and further enhance mechanical bond with rubber.

The above and other objects and features of the invention will be better understood from the following detailed description taken in connection with the accompanying drawings.

According to the invention, there is provided a pneumatic tire having a carcass reinfored with monofilament cords of an organic polymer, the cords comprising a plurality of sub-monofilaments each having a circular transverse cross section and interconnected by radially inwardly curved peripheral extensions thereof to form a substantially flat, rectangular transverse cross-sectional configuration of the definition (i) $0.1 \text{ mm} \leq R \leq 1.0 \text{ mm}$
(ii) $A/B = 2-5$
(iii) $H = (0.3-0.6)B/2$ where R is the radius of the largest one of the sub-monofilaments, A and B are the long side and the short side respectively of the flat, rectangular transverse cross-sectional configuration and H is the depth of the curved peripheral extensions, the ratio of the largest diameter to the smallest diameter of the sub-monofilaments being in the range of 0.4–1.0, and the center-to-center distance between two adjacent sub-monofilaments being in the rage of 2–5 times the diameter of the smallest sub-monofilament.

DETAILED DESCRIPTION OF THE INVENTION

Figure 1:
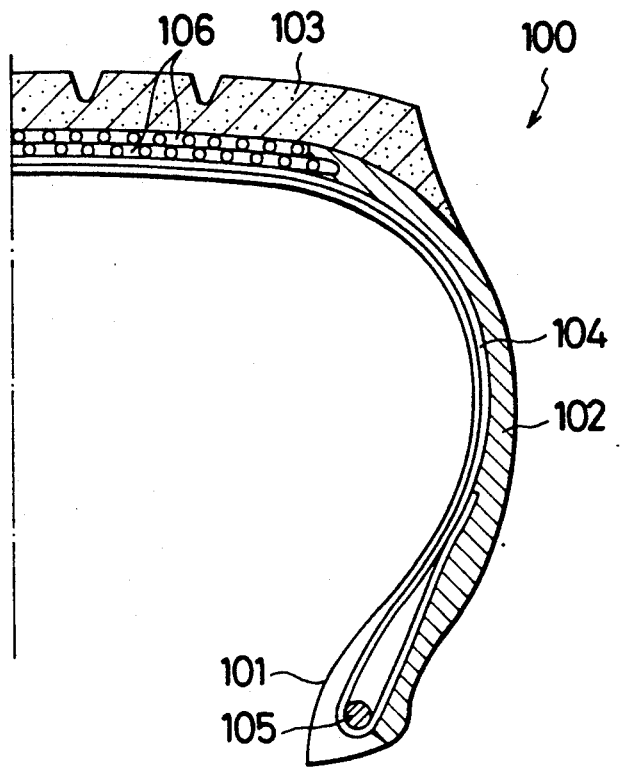
FIG. 1 is a diagrammatic cross-sectional view taken in half along the meridian line of a pneumatic tire constructed according to the invention.

Referring to the drawings and FIG. 1 in particular, there is shown a pneumatic radial tire 100 constructed according to the invention, the tire 100 comprising a pair of spaced beads 101, 101, a pair of side walls 102, 102 extending radially inward to join the respective beads 101, 101, a tread 103 interposed between the side walls 102, 102, a carcass 104 extending between the beads 101, 101 around a bead core 105 and a belt structure 106 surrounding the inner peripheral wall of the tread 103. The monofilament cords 10 are disposed with the long side A of the transverse cross section later described in connection with FIG. 2 lying in the circumferential direction of the carcass 104. In other words, the long side A runs parallel to the tread portion 103.

The monofilament cord, hereafter monofilament, designated at 10 in FIGS. 2–6 inclusive, to which the invention is directed, is used to reinforce the carcass 104 of the tire 100. The monofilament 10 finds its source from an organic polymer including polyamides or copolymers such as of nylon 6, nylon 66, nylon 11, nylon 12, nylon 612, polyester or copolymers such as of polyethylene terephthalate, polyethylene naphthalate, polybutylene terephthalate and other thermoplastic polymers capable of melt spinning. These organic polymers are subjected to melt spinning into the various cross-sectional configurations shown in FIGS. 2–6, followed by drawing and heat-treatment.

Figure 2:
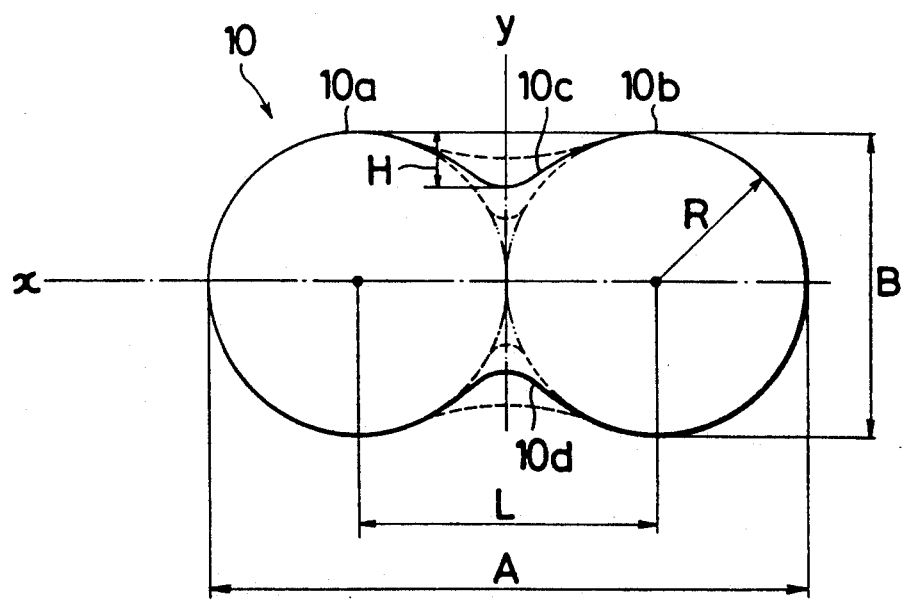
FIGS. 2 through 6 inclusive are transverse cross-sectional views of respective monofilament cords embodying the invention.

The monofilament 10 shown in FIG. 2 comprises a pair of identical sub-monofilaments 10a and 10b having the same circular transverse cross section and the same diameter and extending on the same plane. The two sub-monofilaments 10a and 10b are interconnected by a pair of radially inwardly curved peripheral extensions 10c and 10d to assume a generally flat transverse cross-sectional configuration.

Figure 3:
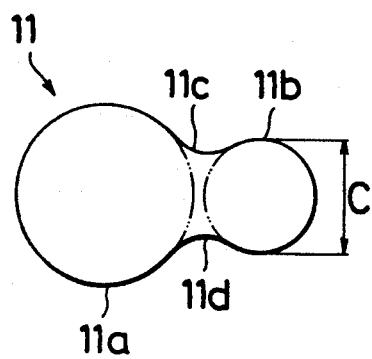

FIG. 3 shows a modified form of monofilament 11 which comprises a large sub-monofilament 11a and a small sub-monofilament 11b interconnected therewith by a pair of radially inwardly curved peripheral extensions 11c and 11d to assume a lobe-like transverse cross-sectional configuration which is also regarded substantially flat within the concept of the invention.

Figure 4:
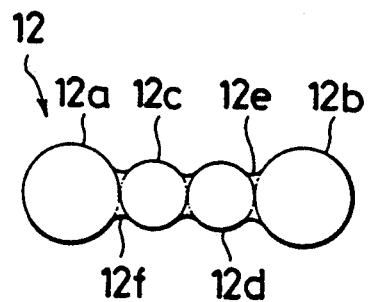

FIG. 4 shows another modified form of monofilament 12 which comprises a pair of large identical outer sub-monofilaments 12a and 12b and a pair of small identical inner sub-monofilaments 12c and 12d interposed between and in diametrical alignment with the large sub-monofilaments 12a and 12b, all of which sub-monofilaments are interconnected by radially inwardly curved peripheral extensions 12e and 13f to assume a generally flat transverse cross-sectional configuration.

Figure 5:
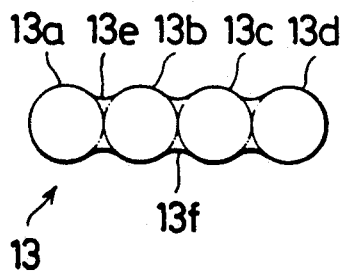

FIG. 5 shows a further modified form of flat monofilament 13 which comprises a row of four identical sub-monofilaments 13a–13d disposed in diammetrical alignment and interconnected by radially inwardly curved peripheral extensions 13e and 13f to assume a flattened transverse cross-sectional configuration.

Figure 6:
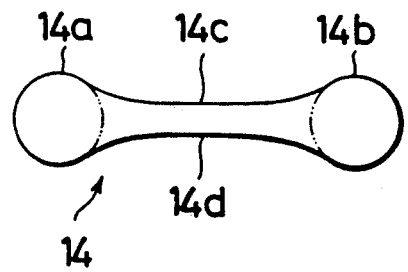

FIG. 6 shows still another modified form of monofilament 14 which comprises a pair of identical sub-monofilaments 14a and 14b spaced apart and interconnected by respective radially inwardly curved peripheral extensions 14c and 14d to assume a generally flat transverse cross-sectional configuration.

In the arrangement of monofilaments involving a plurality of sub-monofilaments differing in diameter, it is preferred to locate the largest sub-monofilament at the outermost longitudinal edge of the monofilament as illustrated in FIGS. 3 and 4.

The peripheral extensions 10c, 10d, 11c, 11d, 12e, 12f, 13e, 13f, 14c and 14d provided for interconnecting adjacent sub-monofilaments are all radially inwardly curved with a gentle curvature. Curves containing sharply pointed or rugged lines should be avoided to eliminate localised stresses and hence the risk of separation of the monofilaments from the rubber layer in which the monofilaments are embedded. It has also been found preferable for the purpose of the invention to use such transverse cross sections of the monofilaments which are symmetrical with respect to an axis x passing through the center of a small diameter B (short side) and/or an axis y passing through the center of a large diameter A (long side) of the monofilament. Symmetry of cross-sectional configurations with respect to both axes x and y is found in all of the monofilaments shown in FIGS. 2, 4, 5 and 6, whereas the monofilament shown in FIG. 3 is symmetrical only with respect to the axis x.

It has now been found that the term flat transverse cross-sectional configuration of a monofilament according to the invention should satisfy the following conditions and relationship:

(i) $0.1 \text{ mm} \leq R \leq 1.0 \text{ mm}$
(ii) $A/B = 2–5$
(iii) $H = (0.3–0.6)B/2$ where R is the radius of the largest one of said sub-monofilament, A and B are the long side and the short side respectively of said flat, rectangular transverse cross-sectional configuration and H is the depth of said curved peripheral extensions, reference being had to FIG. 2.

Smaller radii R than 0.1 mm would lead to reduced reinforcing effect and further to possible stress concentration, while large radii R than 1.0 mm would result in thickened carcass layer counter to light-weight tire features.

The ratio of A/B defines the flatness of a cross-sectionally flat monofilament. Ratios smaller than 2 would fail to achieve the benefits of a monofilament being cross-sectionally flat contemplated under the invention. Larger ratios than 5 would lead to torsioning of the monofilament being handled, rendering carcass sheeting operation difficult.

The depth H to which the peripheral extension of the monofilament is radially inwardly curved is a distance as measured between a common tangent line of two adjacent sub-monofilaments and a lowest (or highest) point of the curve as shown in FIG. 2. The depth H may be increased to provide increased surface area of the monofilament for bonding contact and hence enhanced mechanical bond with a coating rubber. For this reason, depths H smaller than $0.3 \times B/2$ are not effective. However, depths H larger than $0.6 \times B/2$ would result in a curved peripheral extension being constricted and hence reduced mechanical strength of the monofilament.

It has been further found that the ratio of a largest sub-monofilament to a smallest sub-monofilament in monofilament complexes consisting of different diameter sub-monofilaments such as shown in FIGS. 3 and 4 should be 0.4 minimum; or else there will be produced constricted or otherwise deformed cross-sectional configuration of the resulting monofilament which will be devoid of the inventive advantages herein advanced.

It has also been found that a center-to-center distance L between two adjacent sub-monofilaments should be in the range of 2 to 5 times the diameter C of a smaller sub-monofilament for reasons already set forth in connection with the flatness ratio A/B.

INVENTIVE EXAMPLE

A nylon 66 feedstock having a denier size of 3900 was melt-spun into monofilaments having a cross-sectionally flat configuration with $R=0.3$ mm, $A=1.2$ mm, $B=0.4$ mm, $L=0.6$ mm and $H=0.15$. The resulting monofilaments were treated with resorcin.formalin.latex (RFL) adhesive and heat-treated to produce reinforcing cords for pneumatic tire. The strength characteristics of the thus treated cords are indicated in parentheses. The cords were coated with rubber for application to the carcass of tire $T_1$ of size 165/80 R 13 of the construction shown in FIG. 1.

COMPARATIVE EXAMPLE

Figure 7:
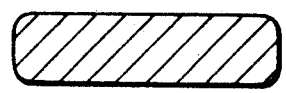
FIG. 7 is a transverse cross-sectional view of a prior art monofilament.

A nylon 66 feedstock having a denier size of 4340 was melt-spun into monofilaments having a flat cross-sectional configuration such as shown in FIG. 7 where A was 1.2 mm and B was 0.4 mm. Reinforcing cords were prepared according to the procedure of Inventive Example and applied as a carcass reinforcement to tire $T_2$ of size and construction similar to tire $T_1$.

Tires $T_1$ and $T_2$ were tested for durability as follows:

Durability test

Tire $T_1$ and $T_2$ were mounted on a $13 \times 5$-J rim, inflated to air pressure of 1.9 kgf/cm$^2$ and test-run on an indoor drum at a speed of 80 km/hr with load varied stepwise from 425 kg for 4 hours, 470 kg for 6 hours, 490 kg for 24 hours finally to 55 kg for 90 hours, respectively. The respective tires $T_1$ and $T_2$ were checked for general appearance and inter alia interface separation between cords and coat rubber, with the results shown in Table 1 below.

TABLE 1

|  | Tire $T_1$ | Tire $T_2$ |
|---|---|---|
| strength (kg) | 32.5 (29.5) | 35.5 (32.5) |
| elongation to break (%) | 19.0 (17.0) | 19.2 (16.5) |
| elongation at 2/25 g/d (%) | 7.5 (6.5) | 7.5 (6.8) |
| appearance defects | none | none |
| interface separation |  |  |

TABLE 1-continued

|  | Tire T$_1$ | Tire T$_2$ |
| --- | --- | --- |
| crack length (above 1 mm) | none | 32 spots |
| crack length (below 1 mm) | none | numerous |

Obviously, various modifications and variations of the present invention are possible in the light of the above teaching. It is therefore to be understood that within the scope of the appended claims the invention may be practiced otherwise than as specifically described.

What is claimed is:

1. A pneumatic tire having a circumferentially extending carcass reinforced with circumferentially extending cords of an organic polymer, said cords comprising a plurality of sub-monofilaments of an organic polymer, each sub-monofilament having a circular transverse cross section and being integrally interconnected lengthwise to each other by radially inwardly curved peripheral extensions thereof to form a cord having a substantially flat and rectangular transverse cross-sectional configuration of the definition (i) $0.1 \text{ mm} \leq R \leq 1.0 \text{ mm}$
(ii) $A/B = 2-5$
(iii) $H = (0.3-0.6)B/2$ where R is the radius of the largest one of said sub-monofilaments, A and B are the long side and the short side respectively of said flat, rectangular transverse cross-sectional configuration of the cord and H is the depth of said curved peripheral extensions, the ratio of the largest diameter to the smallest diameter of said sub-monofilaments being in the range of from 0.4–1.0, and the center-to-center distance between two adjacent sub-monofilaments being in the range of from 2–5 times the diameter of the smallest sub-monofilament.

2. The pneumatic tire of claim 1, wherein said organic polymer is selected from the group consisting of polyamides or co-polymers thereof and polyesters or co-polymers thereof.

3. The pneumatic tire of claim 2, wherein said organic polymer is selected form the group consisting of nylon 6, nylon 66, nylon 11, nylon 12, nylon 612, polyethylene terephthalate, polyethylene naphthalate, and polybutylene terephthalate.

4. The pneumatic tire of claim 1, wherein said organic polymer is a thermoplastic polymer capable of melt spinning.

5. The pneumatic tire of claim 1, wherein said cords have transverse cross sections that are symmetrical with respect to at least one of an axis passing through the center of and perpendicular to said short side B and an axis passing through the center of sand perpendicular to said long side A.

6. The pneumatic tire of claim 5, wherein said transverse cross sections are symmetrical to both said axes.

7. The pneumatic tire of claim 1, wherein said cords are disposed with the long side A of their said flat, rectangular transverse cross-sectional configuration lying parallel to a tread portion of the tire.

* * * * *